US012219045B2

(12) United States Patent
Kalidindi et al.

(10) Patent No.: US 12,219,045 B2
(45) Date of Patent: Feb. 4, 2025

(54) SYSTEM AND METHOD FOR GENERATING AN OMNI-CHANNEL SUPPORT PLATFORM

(71) Applicant: HCL TECHNOLOGIES LIMITED, New Delhi (IN)

(72) Inventors: Mounika Kalidindi, Hyderabad (IN); Banish Bansal, Noida (IN); Harikrishna C Warrier, Bengaluru (IN); S U M Prasad Dhanyamraju, Hyderabad (IN)

(73) Assignee: HCL TECHNOLOGIES LIMITED, New Delhi (IN)

( * ) Notice: Subject to any disclaimer, the term of this patent is extended or adjusted under 35 U.S.C. 154(b) by 245 days.

(21) Appl. No.: 17/189,127

(22) Filed: Mar. 1, 2021

(65) Prior Publication Data

US 2021/0273782 A1  Sep. 2, 2021

(30) Foreign Application Priority Data

Mar. 2, 2020 (IN) ............................. 202011008962

(51) Int. Cl.
*H04L 9/06* (2006.01)
*G06Q 20/12* (2012.01)
*H04L 9/00* (2022.01)

(52) U.S. Cl.
CPC .......... *H04L 9/0643* (2013.01); *G06Q 20/12* (2013.01); *H04L 9/0637* (2013.01); *H04L 9/50* (2022.05); *H04L 2209/56* (2013.01)

(58) Field of Classification Search
CPC ....... H04L 9/0643; H04L 9/0637; H04L 9/50; H04L 2209/56; H04L 9/3239; G06Q 20/12; G06Q 2220/00; G06Q 20/02
See application file for complete search history.

(56) References Cited

U.S. PATENT DOCUMENTS

2015/0163254 A1\* 6/2015 Romero ................. G06Q 20/12
709/227
2017/0098282 A1\* 4/2017 Klemm ................. G06Q 50/01
(Continued)

FOREIGN PATENT DOCUMENTS

| CN | 106528775 B | 1/2020 |
| KR | 20190115557 A | 10/2019 |
| WO | 2018165763 A1 | 9/2018 |

OTHER PUBLICATIONS

Batiz-Lazo, Bernardo, "Is Blockchain the Next Big Thing in Omnichannel Technology?" SSRN Electronic Journal, Jan. 2017.

*Primary Examiner* — Taghi T Arani
*Assistant Examiner* — Blake I Narramore
(74) *Attorney, Agent, or Firm* — Kendal M. Sheets

(57) ABSTRACT

The present disclosure relates to system(s) and method(s) for generating an Omni-channel support platform. The method comprises integrating a multi-channel support system with a blockchain framework. Further, the method comprises generating an Omni-channel support platform based on the integration. The Omni-channel support platform comprises an Omni-channel support block for a user from a set of users. The Omni-channel support block comprises a support ledger and a support smart contract for the user. The Omni-channel support block further comprises capturing transaction data associated with the user from the multiple support channels. Further, the Omni-channel support block comprises recommending one or more resolutions to each user upon based on a support request.

8 Claims, 5 Drawing Sheets

(56) References Cited

U.S. PATENT DOCUMENTS

| | | | |
|---|---|---|---|
| 2017/0337287 A1* | 11/2017 | Gill | G06Q 10/06311 |
| 2018/0054524 A1* | 2/2018 | Dahan | G06F 16/951 |
| 2018/0152522 A1* | 5/2018 | White | H04L 67/148 |
| 2018/0204239 A1* | 7/2018 | Licht | G06Q 20/363 |
| 2018/0247320 A1* | 8/2018 | Gauld | G06Q 30/0201 |
| 2019/0158671 A1* | 5/2019 | Feast | G06Q 10/10 |
| 2019/0164140 A1* | 5/2019 | Pasupula | G06Q 30/08 |
| 2019/0171438 A1* | 6/2019 | Franchitti | G06N 3/08 |
| 2019/0228461 A1* | 7/2019 | Domokos | G06Q 30/0201 |
| 2019/0361626 A1* | 11/2019 | East | G06F 3/0653 |
| 2020/0044823 A1* | 2/2020 | Savir | H04L 63/123 |
| 2020/0274830 A1* | 8/2020 | Swami | G06F 7/483 |
| 2020/0311688 A1* | 10/2020 | Lipman | G06F 16/1774 |
| 2020/0322661 A1* | 10/2020 | Korte | H04N 21/442 |
| 2020/0322662 A1* | 10/2020 | Korte | G06N 5/01 |
| 2021/0135856 A1* | 5/2021 | Adibi | H04L 9/3239 |
| 2021/0192538 A1* | 6/2021 | Varvarian | G06F 16/27 |
| 2022/0210274 A1* | 6/2022 | Dahan | H04M 3/5231 |

\* cited by examiner

SYSTEM AND METHOD FOR GENERATING AN OMNI-CHANNEL SUPPORT PLATFORM

CROSS-REFERENCE TO RELATED APPLICATIONS AND PRIORITY

The present application claims benefit from Indian Complete Patent Application No. 202011008962 filed on 2 Mar. 2020 the entirety of which is hereby incorporated by reference.

TECHNICAL FIELD

The present disclosure in general relates to the field of an Omni-channel support system. More particularly, the present invention relates to a system and method for generating an Omni-channel support platform.

BACKGROUND

Currently, organizations provide multi-channel support whereby they offer support via one of these channels and enable customers to interact via any of these channels. It is to be understood that providing multiple channels to contact for support gives customers the option to choose their preferred channel for the issue at hand. However, the problem is that the context and customer history are not shared across channels as each channel operates separately. Also, the support activities on these different channels are taken on by entirely different teams, so there is no continuity of experience across different channels.

Further, the organizations that have implemented multi-channel support have challenges to migrate to an Omni-channel support. Some of the challenges includes cost issues as the implementation of Omni-channel support will most likely require significant investment in a technology and a business change. Further, there occurs the challenge of complexity as the system is complicated due to confluence of multiple channel information.

SUMMARY

Before the present systems and methods for generating an Omni-channel support platform, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for generating the Omni-channel support platform. This summary is not intended to identify essential features of the claimed subject matter nor is it intended for use in determining or limiting the scope of the claimed subject matter. In another implementation, a method for generating an Omni-channel support system is illustrated. The method comprises integrating a multi-channel support system with a blockchain framework. The multichannel support system comprises multiple support channels. The method further comprises generating the Omni-channel support platform based on the integration. The Omni-channel support platform comprises an Omni-channel support block for a user from a set of users. The Omni-channel support block comprises a support ledger and a support smart contract for the user. The Omni-channel support block comprises capturing transaction data associated with the user from the multiple channels. Further, the Omni-channel support block comprises recommending one or more resolutions to the user upon based on a support request. The one or more resolutions are recommended automatically in real-time based on analysis of the transaction data.

In one implementation, a system for generating an Omni-channel support platform is illustrated. The system comprises a memory and a processor coupled to the memory, further the processor is configured to execute instructions stored in the memory. In one embodiment, the processor may execute instructions stored in the memory for integrating a multi-channel support system with a blockchain framework. The multichannel support system comprises multiple support channels. The processor may further execute instructions stored in the memory for generating the Omni-channel support platform based on the integration. The Omni-channel support platform comprises an Omni-channel support block for a user from a set of users. The Omni-channel support block comprises a support ledger and a support smart contract for the user. The Omni-channel support block comprises capturing transaction data associated with the user from the multiple channels. Further, the Omni-channel support block comprises recommending one or more resolutions to the user upon based on a support request. The one or more resolutions are recommended automatically in real-time based on analysis of the transaction data.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating an Omni-channel support platform are now described. The disclosed embodiments of the system and method for generating the Omni-channel support platform are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for generating an Omni-channel support platform is not intended to be limited to the embodiments illustrated, but is to be accorded the widest scope consistent with the principles and features described herein.

In one embodiment, a method for generating an Omni-channel support platform is disclosed. The Omni-channel support platform may be generated based on an integration of a multichannel support system and a blockchain framework. The Omni-channel support platform may comprise an Omni-channel support block for a user from a set of users. The Omni-channel support block may comprise a support ledger and a support smart contract for each user.

Figure 1:
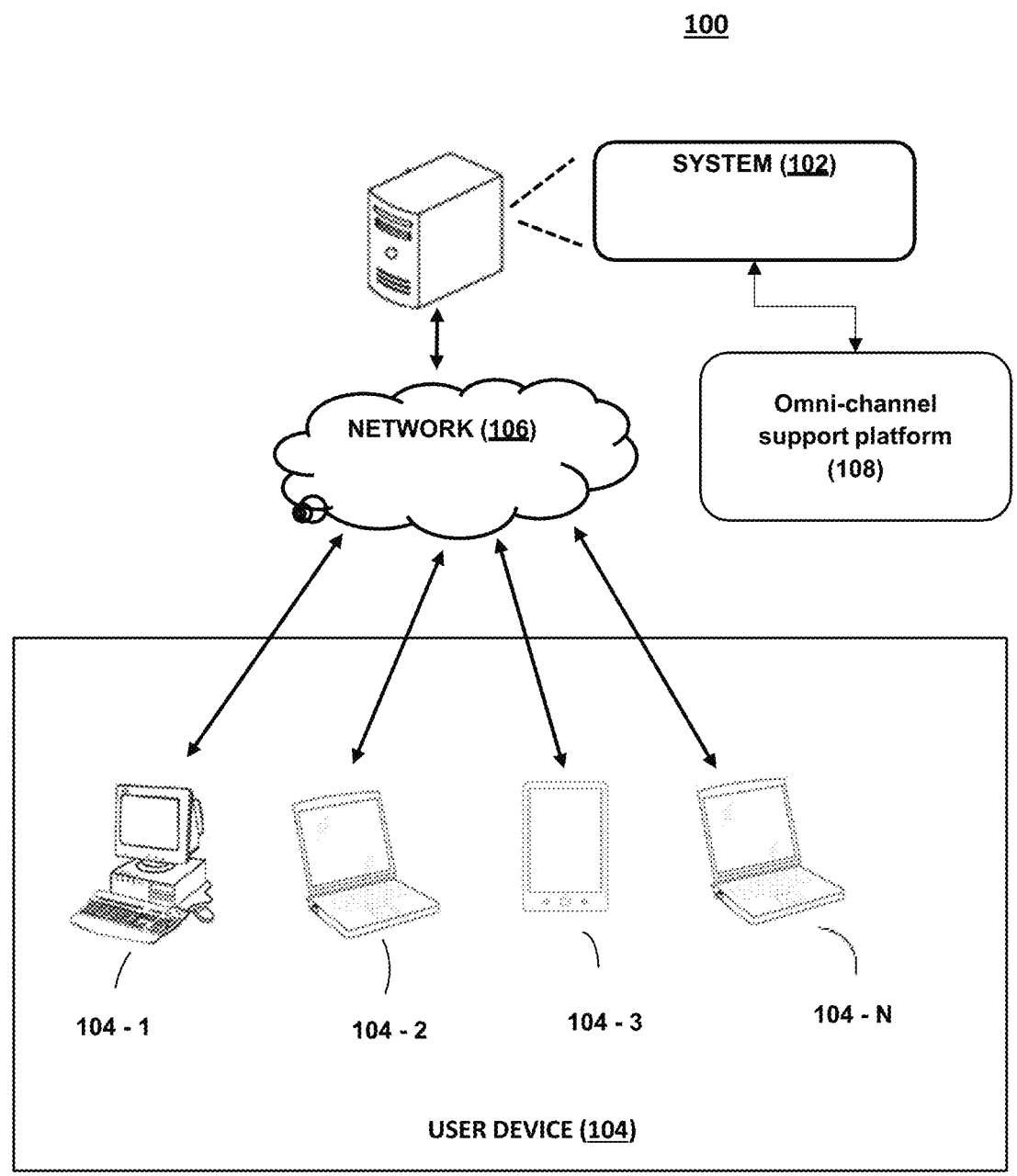
FIG. 1 illustrates a network implementation of a system for generating an Omni-channel support platform, in accordance with an embodiment of the present subject matter.

Referring now to FIG. 1, a network implementation 100 of a system 102 for generating an Omni-channel support platform 108 is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, at least one processor may be configured to fetch and execute computer-readable instructions stored in the memory. In one aspect, the I/O interface may include a variety of software and hardware interfaces, for example, a web interface, a graphical user interface, and the like. The I/O interface may allow the system 102 to interact with the user directly or through the user device 104. Further, the I/O interface may enable the system 102 to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
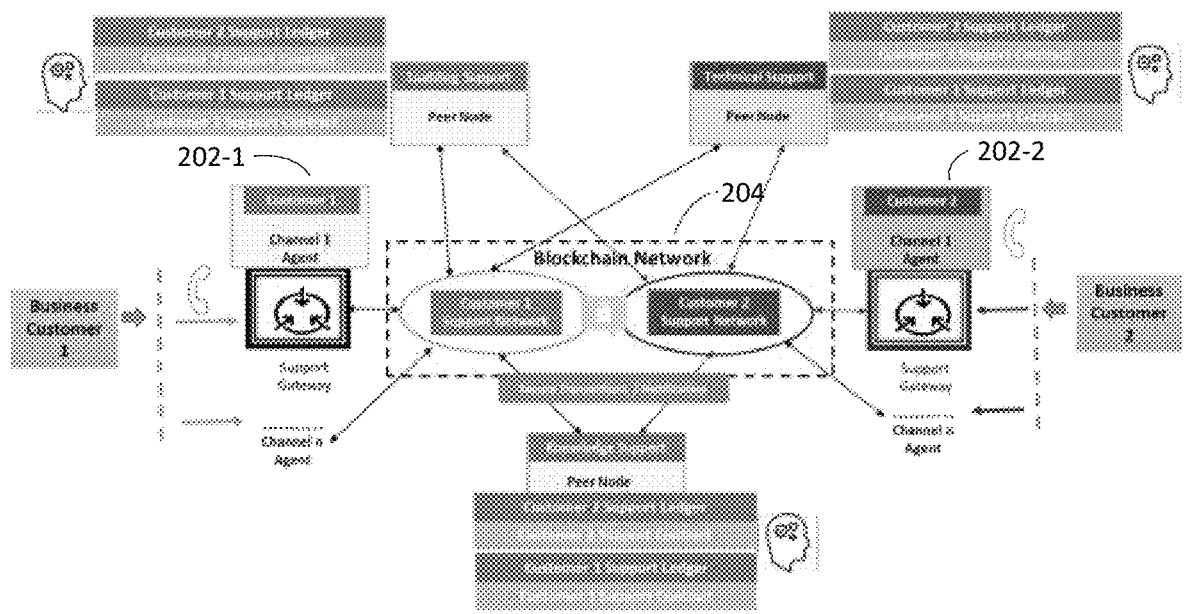
FIG. 2 illustrates an architecture of the Omni-channel support platform, in accordance with an embodiment of the present subject matter.
Figure 3:
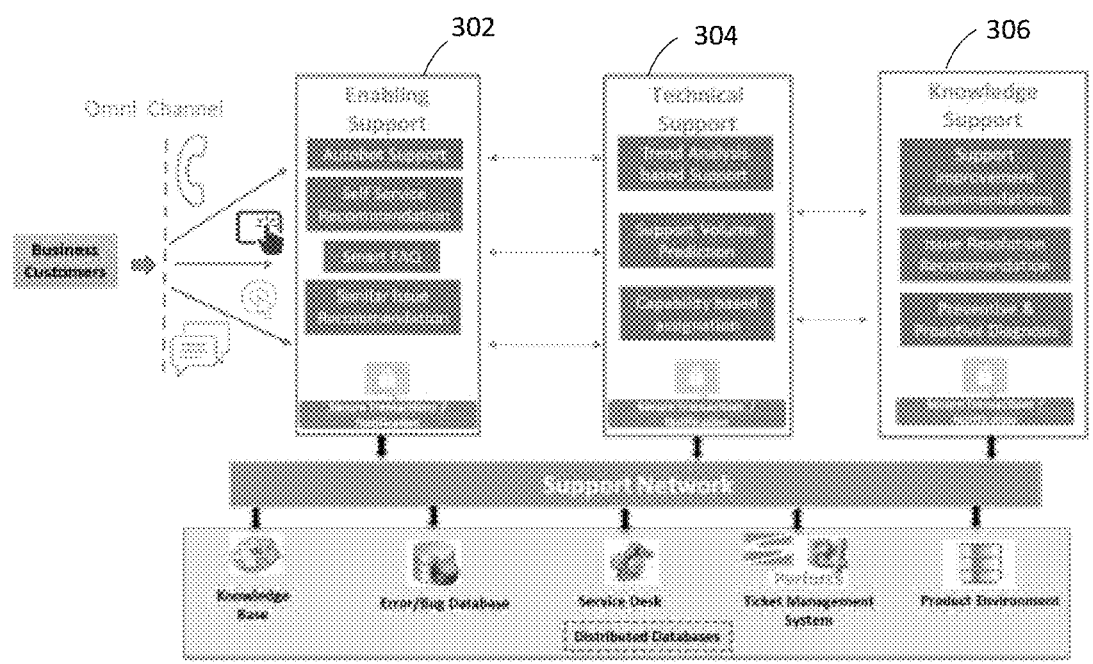
FIG. 3 illustrates the Omni-channel support platform, in accordance with an embodiment of the present subject matter.
Figure 4:
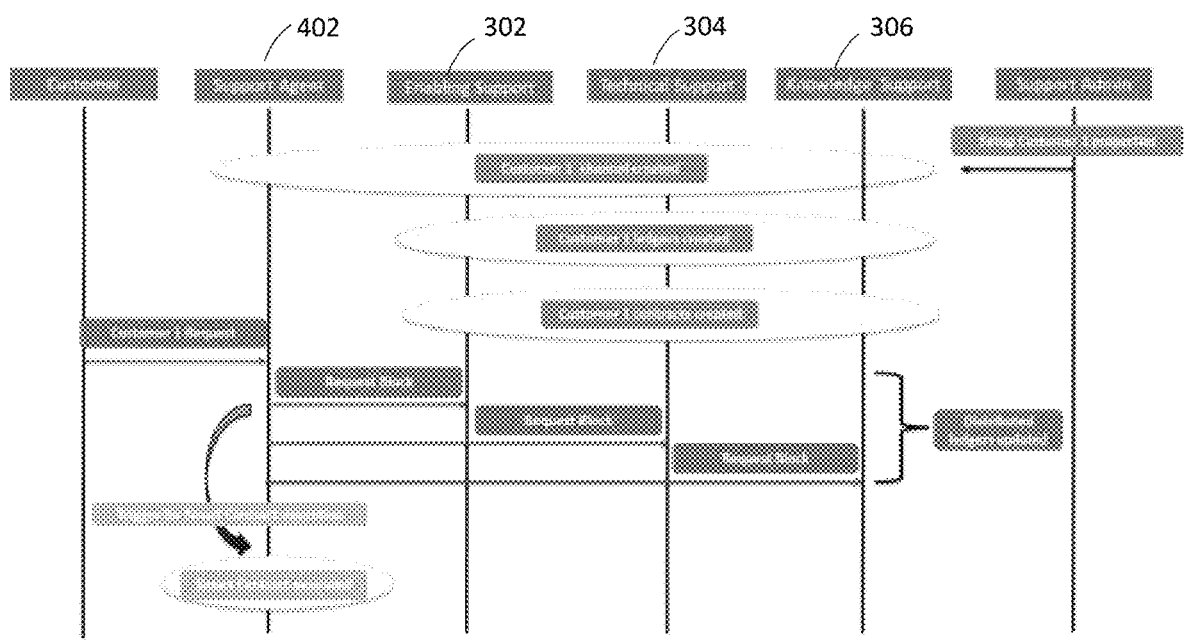
FIG. 4 illustrates an operation of the Omni-channel support platform, in accordance with an embodiment of the present subject matter.

Referring now to FIG. 2, an architecture of the Omni-channel support platform 108 is illustrated in accordance with an embodiment of the present subject matter. Further, referring to FIG. 3, the Omni-channel support platform is illustrated in accordance with an embodiment of the present subject matter. Furthermore, referring to FIG. 4, an operation of the Omni-channel support platform is illustrated in accordance with an embodiment of the present subject matter. It is to be noted that figured 2, 3 and 4 are explained further together.

In one embodiment, a multichannel support system may be integrated with a blockchain framework. Based on the integration, the Omni-channel support platform 108 may be generated. The multichannel support system may comprise multiple channels such as telephone, email, social media, live chart and the like. In one aspect, the multi-channel support system may be transformed into a cognitive, secure and transparent Omni-channel support platform 108. The transformation is done using the blockchain architecture.

Further, the Omni-channel support platform 108 may comprise a first Omni-channel support block 202-1 for a user 1, a second Omni-channel support block 202-2 for a user 2 and the like. The first Omni-channel support block 202-1, the second Omni-channel support block 202-2, and the like may be collectively referred as an Omni-channel support block 202. It means the Omni-channel support platform may comprise an Omni-channel support block 202 for a user from a set of users. The set of users may correspond to users of the multi-channel support system. Each user may be referred as a customer. In one example, if there are 10 users using the Omni-channel support platform. In this case, 10 Omni-channel support blocks may be generated in the Omni-channel support platform, so that each user can have one Omni-channel support block. The Omni-channel support block 202 may be a distributed block.

The Omni-channel support block 202 may further comprise a support ledger and a support smart contract. In one embodiment, the Omni-channel support block 202 may be connected to a blockchain channel 204. The blockchain channel 204 may further comprise a separate ledger and a separate smart contract for each of an enabling support 302, a technical support 304, and a knowledge support 306. The blockchain channels may be linked by peer nodes for each support entity. The support entity indicates the enabling support, the technical support, and the knowledge support.

In one aspect, the enabling support 302 may involve functions that are configured to resolve the basic set of queries and issues associated with the user. The basic set of queries and issues may be one of, but not limited to, an administrative process related issue such as contract, order, invoice, payment, inventory, and the like, a repair and replacement support, a field service bulletins, regulatory compliance information, a security requirements information, warranty or extended warranty support, promotions and Advertisement Support, and the like.

Further, the technical support 304 may involve functions that are related to the technical or operational aspects of support queries. The technical or operational aspect may be one of, but not limited to, a technical assistance, a managed services support, a submission of requests or queries, a ticket creation support, a contact portal-based interactions, a hotline service, and the like.

Furthermore, the knowledge or training support 306 relates to support aspects that involve gaps or information that the customer seeks as part of support. The support may include one of, but not limited to, a training support, FAQs, Design and Optimization Support, Tutorials and online knowledge support, and the like.

The support smart contact may further comprise a logic associated with triggering support activities to contractual agreements of support functions. The support ledger may store transaction data associated with the user. The support ledger may be a distributed ledger. The transaction data may comprise support requests, and other data associated with the user. It is to be noted that there exists a separate leger and a separate smart contract for each user. In one embodiment, the Omni-channel support block may comprise capturing the transaction data associated with a user, from a set of users. The transaction data may be captured from multiple channels.

In the embodiment, the support smart contract may embed cognitive functions. The cognitive functions may be configured to augment the support experience automatically without any manual intervention as part of a smart contract execution. It is to be noted that there is no user support personal dependency on providing cognitive responses to the users, and the overall support experience is automatically enhanced for all the users as per the contractual obligations.

In one embodiment, the Omni-channel support block may receive a support request from the user. Upon receiving the support request, the support request 402 may get registered by a support gateway that may be referred as a support agent. Further, a request block associated with the support request may be created, and updated in the support ledger associated with the support entities. Based on this, the support request may be transparently available across the nodes. Once the support request is acted on by the support entities, the support smart contract may get triggered. Based on the triggering, functionality, associated with the support smart contract, related to a Service Level Agreement (SLA) and cognitive functions may get triggered. Each and every activity associated with the user may be recorded on the support ledgers, and all the support entities may be kept in sync.

Further, the cognitive functions related to collection of the transaction data, support patterns and other information across all channels may be analysed. The analysis may help in performing descriptive, predictive and cognitive steps. This may be referred as the smart contact execution. The cognitive functions may further recommend one or more resolutions to the user in order to resolve the support request.

The one or more resolutions may be recommended based on the SLA, and the analysis of the transaction data, support patterns, and other information functions. The one or more resolutions may be generated automatically in real-time. In other words, the Omni-channel support block may generate one or more resolutions for the support requests raised by the user.

In one aspect, a feedback, associate with the one or more resolutions, may be received from the user. The feedback may be further used to update the Omni-channel support block associated with the user.

Further, the Omni-channel support block may be updated based on historical resolutions proposed by a cognitive function, the one or more resolutions and steps provided in real-time, and sign off by the user based on resolution of the issue. Based on the update, the Omni-channel support block may comprise comprehensive information of all transactions, previous resolutions and recommendations provided to the user. It may help in future to trigger self-service scripts and improve the user experience.

In one example, consider a new roll out of a telecommunication system in the field. The support issues may include installation issues comprising the queries that arise during new installation which may include knowledge gaps, Configuration issues comprises setting up parameters and optimizing them for efficient operations. These may be related to the equipment that are being rolled out. It is to be noted that in the multi-channel approach, for some issues, call up support desk of the OEM; for some others provide logs via email, for some other issues chat with the support team, and for some others register on the website for getting some information or manuals.

In the Omni-channel approach, all these issues and queries are logged in the distributed ledger created for that customer. A holistic view of the set of problems faced can be derived out of these logs. A cohesive and coordinated set of responses are provided. Inter-dependent and inter-related issues are resolved considering the bigger picture. If any SLA gets breached, the agreement conditions trigger automatically via the smart contract. Customer experience is enhanced overall.

In one embodiment, construe a feedback given by a user indicating that a particular section in a knowledge manual provided as part of the knowledge/training support helped her in resolving a specific issue that she was facing. This feedback may be provided as a recommendation solution when a new technical support query of a similar nature is generated by any other user. This is an example of how the user experience improves as the system learns through cognitive functions. This is possible only when the experiences across different support entities are aggregated at a common place, like a distributed ledger in this case.

Exemplary embodiments discussed above may provide certain advantages. Though not required to practice aspects of the disclosure, these advantages may include those provided by the following features.

Some embodiments of the system and the method is configured to use a blockchain framework for secure and transparent transactions, and thus distributed ledger based approach is used.

Some embodiments of the system and the method is configured to automate a cognitive analytics functions using a smart contract execution method.

Some embodiments of the system and method is configured to improved customer experience for the support channels.

Figure 5:
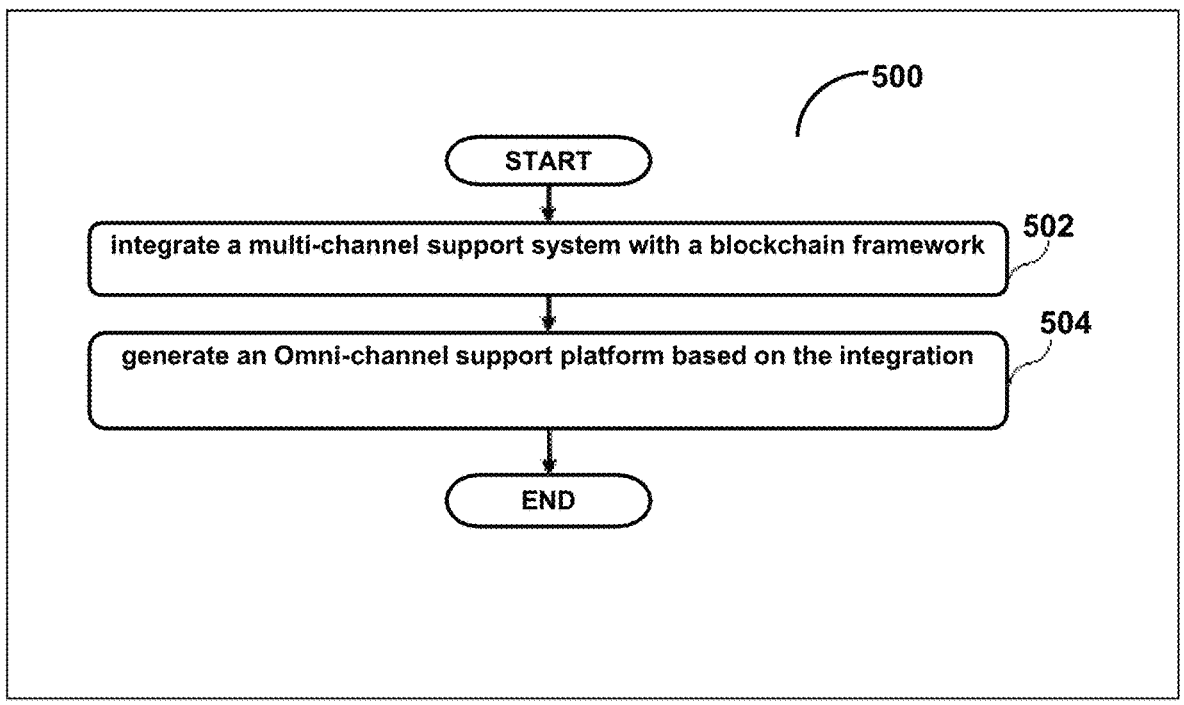
FIG. 5 illustrates a method for generating an Omni-channel support platform, in accordance with an embodiment of the present subject matter.

Referring now to FIG. 5, a method 500 for generating an Omni-channel support platform, is disclosed in accordance with an embodiment of the present subject matter. The method 500 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 may be considered to be implemented in the above described system 102.

At block 502, a multi-channel support system may be integrated with a blockchain framework. The multichannel support system may comprise multiple support channels that are used by a set of users.

At block 504, an Omni-channel support platform may be generated based on the integration. The Omni-channel support platform may comprise an Omni-channel support block for a user from a set of users. The Omni-channel support block may comprise a support ledger and a support smart contract for the user.

Further, the Omni-channel support block may comprise capturing transaction data associated with the user from the multiple support channels. The Omni-channel support block may further comprises recommending one or more resolutions to the user upon based on a support request. The one or more resolutions may be recommended automatically in real-time based on analysis of the transaction data.

Although implementations for systems and methods for generating an Omni-channel support platform have been described, it is to be understood that the appended claims are not necessarily limited to the specific features or methods described. Rather, the specific features and methods are disclosed as examples of implementations for generating the Omni-channel support platform.

The invention claimed is:

1. A method for generating an Omni-channel support platform, the method comprises:
   integrating, by a processor, a multi-channel support system with a blockchain framework, wherein the multi-channel support system comprises multiple support channels;
   generating, by the processor, an Omni-channel support platform based on the integration,
      wherein the Omni-channel support platform comprises an Omni-channel support block for a user from a set of users,
      wherein the Omni-channel support block comprises a support ledger and a support smart contract for the user,
      wherein the support ledger corresponds to a distributed ledger that records support interactions and transactions associated with the set of users;
      wherein the support smart contact comprises a logic associated with triggering support activities to contractual agreements of support functions; and
      wherein the Omni-channel support block comprises:
         capturing transaction data associated with the user from the multiple support channels, wherein the multiple support channels comprise at least one of email, a chat, a phone, and social media; and
         recommending one or more resolutions to the user upon based on one or more support requests,
            wherein the one or more resolutions are recommended automatically in real-time based on analysis of the transaction data, and
            wherein the support requests are directed to resolving user issues related to the user interaction with the multi-channel support system;
   updating the Omni-channel support block based on historical resolutions proposed by a cognitive function, the one or more resolutions, and sign off by the user based on a resolution of the issue, wherein the cognitive function is trained on historical support data;
   embedding the cognitive function within the support smart contract to automatically enhance the support experience without manual intervention, ensuring that the support activities are aligned with contractual obligations and service level agreements (SLAs); and
   utilizing the blockchain framework to ensure secure and transparent recording of the support interactions and the transactions, thereby providing a cohesive and coordinated response to the support requests across multiple support channels.

2. The method as claimed in claim 1, wherein the recommendations of the one or more resolutions comprises:
   receiving the one or more support requests from the user;
   capturing one or more activities associated with the support ledger of the user; and
   generating the recommendations of the one or more resolutions based on a service level agreement and cognitive functions by analysis of the one or more activities.

3. The method as claimed in claim 1, further comprising linking the multiple support channels by peer nodes from each support entity.

4. The method as claimed in claim 1, wherein the support ledger stores the transaction data associated with the user.

5. A system to generate an Omni-channel support platform, the system comprising:
   a memory;
   a processor coupled to the memory, wherein the processor is configured to execute instructions stored in the memory to:
   integrate a multi-channel support system with a blockchain framework, wherein the multi-channel support system comprises multiple support channels;
   generate an Omni-channel support platform based on the integration,
      wherein the Omni-channel support platform comprises an Omni-channel support block for a user from a set of users,
      wherein the Omni-channel support block comprises a support ledger and a support smart contract for the user, wherein the support ledger corresponds to a distributed ledger that records support interactions and transactions associated with the set of users;

wherein the support smart contact comprises a logic associated with triggering support activities to contractual agreements of support functions; and wherein the Omni-channel support block comprises:
capturing transaction data associated with the user from the multiple support channels, wherein the multiple support channels comprise at least one of email, a chat, a phone, and social media; and
recommending one or more resolutions to the user upon based on one or more support requests,
wherein the one or more resolutions are recommended automatically in real-time based on analysis of the transaction data, and
wherein the support requests are directed to resolving user issues related to the user interaction with the multi-channel support system;

update the Omni-channel support block based on historical resolutions proposed by a cognitive function, the one or more resolutions, and sign off by the user based on a resolution of the issue, wherein the cognitive function is trained on historical support data;

embed the cognitive function within the support smart contract to automatically enhance the support experience without manual intervention, ensuring that the support activities are aligned with contractual obligations and service level agreements (SLAs); and utilize the blockchain framework to ensure secure and transparent recording of the support interactions and the transactions, thereby providing a cohesive and coordinated response to the support requests across multiple support channels.

6. The system as claimed in claim 5, wherein the recommendations of the one or more resolutions comprises:
receiving the one or more support requests from the user;
capturing one or more activities associated with the support ledger of the user; and
generating the recommendations of the one or more resolutions based on a service level agreement and cognitive functions by analysis of the one or more activities.

7. The system as claimed in claim 5, further configured to link blockchain channels, for each customer, by peer nodes from each support entity.

8. The system as claimed in claim 5, wherein the support ledger stores the transaction data associated with the user.

* * * * *